United States Patent Office 2,985,625
Patented May 23, 1961

2,985,625

COMPOSITION COMPRISING DERIVATIVES OF CROSS-LINKED CARBOXYLIC ACID ANHYDRIDE POLYMERS AND METHOD OF PREPARING SAME

John F. Jones, Cuyahoga Falls, Ohio, assignor to The B. F. Goodrich Company, New York, N.Y., a corporation of New York No Drawing. Filed Jan. 18, 1954, Ser. No. 404,784

29 Claims. (Cl. 260—78)

This invention relates to polymeric emulsifying, emulsion stabilizing and suspending agents adapted to emulsify and suspend or disperse both liquid oil materials and solid substances, and to a method of stabilizing emulsions and suspensions. The invention more particularly relates to insoluble but hydrophilic emulsifying and suspending agents which are partial ester or partial amide derivatives of an interpolymer of an alpha-beta unsaturated dicarboxylic acid anhydride such as maleic anhydride, a vinyl alkyl ether and a cross-linking agent.

In the copending application of Joseph F. Ackerman and John F. Jones, Serial No. 406,058, filed January 25, 1954, now U.S. Patent 2,923,692, the copending application of Harold P. Brown, Serial No. 307,711, filed September 3, 1952, now U.S. Patent 2,798,053, and the copending application of Harold P. Brown and Richard G. Bauman, Serial No. 405,659, filed January 22, 1954, now U.S. Patent 2,858,281, there are disclosed insoluble, but highly hydrophilic polymeric salts useful in mucilaginous compositions and having suspending action, to a greater or lesser degree, on solid substances. These insoluble but highly hydrophilic polymer salts, however, do not possess, to any substantial degree at least, the ability to emulsify liquid materials and particularly liquid oily materials. Consequently, in many mucilaginous compositions which contain both liquid and solid substances dispersed in an aqueous medium, such as polishing and cleaning compositions which contain oils, waxes and solid polishing agents, it is necessary to use an auxiliary surface-active agent to stabilize the emulsion or dispersion of oil materials.

I have discovered that certain derivatives of some of the insoluble but highly hydrophilic interpolymers made from monomeric mixtures of at least three essential monomers, one being an alpha-beta unsaturated carboxylic acid anhydride, such as maleic anhydride, another being a vinyl alkyl ether, and the third being a cross-linking agent containing a plurality of, i.e. more than one polymerizable $CH_2=<$ groupings, are emulsifying-suspending or emulsifying-dispersing agents with a novel ability to emulsify and suspend or disperse both liquid and solid ingredients in aqueous media. The derivatives having these unique properties are the monovalent alkaline salts of partial esters and partial amides of the interpolymers. The interpolymer does not, per se, possess emulsifying or dispersing properties and likewise the interpolymer salts do not, per se, possess these properties. The derivatives of this invention, however, can simultaneously emulsify water-immiscible organic liquids and suspend or disperse finely-divided insoluble and hydrophobic organic and inorganic solids such as fillers, polishing agents, organic and inorganic coloring pigments, carbon black, waxes, resins and others, forming stable and very viscous mucilaginous compositions with water or other aqueous medium. Such compositions are useful as cosmetics, pharmaceuticals, cleaning and polishing compounds, latex coating and impregnating compositions, textile printing and coloring compositions for textile decoration and many other uses.

The dicarboxylic acid anhydrides useful in the production of the basic interpolymers for use in this invention have the general structure

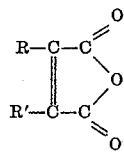

wherein R and R' are selected from the group consisting of hydrogen, halogen, and the cyanogen ($-C\equiv N$) groups and alkyl, aryl, alkaryl, aralkyl, and cycloaliphatic groups. Illustrative anhydrides of this structure include maleic anhydride itself, chloromaleic anhydride, 2,3-dicyano maleic anhydride, dimethyl maleic anhydride, diphenyl maleic anhydride, dibenzyl maleic anhydride, di-(p-methylphenyl) maleic anhydride, dicyclohexyl maleic anhydride and others. Maleic anhydride, because of its ready availability, low lost and highly satisfactory performance is the preferred monomer of this group.

In the production of the basic interpolymers for use in this invention any of the vinyl alkyl ethers containing from 3 to 10 carbon atoms may be utilized. Included within this class are vinyl methyl ether, vinyl ethyl ether, vinyl isopropyl ether, vinyl n-butyl ether, vinyl isobutyl ethers, vinyl hexyl ethers, vinyl 2-ethylhexyl ethers, and vinyl decyl ethers. It is preferred, however, to utilize the lower vinyl alkyl ethers containing from 3 to 6 carbon atoms, that is, methyl vinyl ether, vinyl ethyl ether, vinyl isopropyl ether, vinyl isobutyl ethers, vinyl n-butyl ether and others. Of these vinyl methyl ether is much preferred because of its favorable reaction characteristics with maleic anhydride and because of its generally lower cost.

The third essential monomeric material may be any polymerizable material which contains a plurality of polymerizable $CH_2=C<$ groupings and which is reactive with maleic anhydride and vinyl ether type monomers. Polyunsaturated hydrocarbons, esters, amides, nitriles, acids, sulfones, polyunsaturated acid anhydrides, ethers, ketones, alcohols, and other polyunsaturated compounds of this class incorporating one or more of these and other functional groups are utilizable. Cross-linking agents illustrative of this broad class include the polymerized dienes such as polybutadiene and other open-chain aliphatic conjugated diene polymers; unsaturated sulfones such as hexaallyl trimethylene trisulfone; unsaturated amides such as trimethacrylyl triazine; di- and polyunsaturated esters such as ethylene glycol diacrylate, allyl acrylate, allyl cinnamate, diallyl maleate, diallyl phthalate, diallyl malonate, and many others; polyunsaturated acids such as beta-styryl acrylic acid and others; polyunsaturated acid anhydrydes such as acrylic anhydride, methacrylic anhydride and others; polyunsaturated ethers such as divinyl ether, diallyl ether, diallyl ethylene glycol ether, 1,4,5,8-naphthalene tetrol ethers, the vinyl, allyl, methallyl and crotyl polyethers containing 2 to 7 or more alkenyl ether groups per molecule and others; polyunsaturated ketones such as divinyl ketone, diallyl ketone and others and polyunsaturated compounds containing one or more functional groups such as the half ethers, allyl-beta-allyloxy-propionate and allyl methacrylyl sucrose, the half ester monoallyl maleate, the partial allyl ethers of polyhydric alcohols such as diallyl glycerol ether and others.

A preferred class of cross-linking agents because of their ability to produce insoluble interpolymers which are resistant to hydrolysis, are selected from the class consisting of polyunsaturated hydrocarbons, solvent soluble polymeric open-chain, aliphatic conjungated dienes, and polyalkenyl polyethers of polyhydric alcohols containing at least 4 carbon atoms and at least 3 hydroxyl groups, all of which contain a plurality of polymerizable $CH_2=C<$ groupings, the double bonds of which are not in conjugated relationship one with the other. The amount of cross-linking agent can vary from about 0.01% to about 10% by weight of the remaining monomers. Many illustrative examples of each type of monomer classifiable in this preferred class of cross-linking agents are illustrated above. The polyalkenyl polyethers of polyhydric alcohols such as the polyallyl ether of sucrose and their preparation are described in greater detail in the copending application of Harold P. Brown, Serial No. 307,711, filed September 3, 1952. The polymeric diene cross-linking agents and their uses are described in the copending application of H. P. Brown and Richard G. Bauman, Serial No. 405,659, filed January 22, 1954.

Since the maleic acid type of dicarboxylic acid anhydride evidences a strong tendency to form alternating copolymers with most of the monomers copolymerizable therewith, it is difficult to utilize monomeric proportions other than those adapted to yield the alternating polymer. In multi-component interpolymers such as are described above, it is greatly preferred therefore to utilize monomeric mixtures in which the alpha-beta unsaturated acid anhydride and vinyl alkyl ether monomers in substantially equimolar proportions and varying the amount of cross-linking agent to obtain the properties desired in the polymer. If proportions of alpha-beta unsaturated acid and vinyl alkyl ether other than equimolar are utilized, the yield of polymer is greatly reduced and the polymer obtained will usually contain a relatively greater proportion of cross-linking agent than is represented in the original monomeric charge. In addition to the three essential monomers described above, up to 20% of the total monomeric mixture may consist of one or more other monoolefinic monomers such as styrene, acrylonitrile, vinyl chloride, vinylidene chloride, vinyl acetate, vinyl benzoate, diethyl maleate, ethylene, isobutylene, acrylic acid, and others. It is greatly preferred, however, that only the three essential monomeric materials be utilized.

The derivatives of this invention are prepared by reacting the carboxyl containing interpolymer with an alcohol or an amine. There is a strong tendency for the interpolymer to readily form the half ester of half amides. Very severe conditions, involving the use of catalysts, higher temperatures, and a large excess of reagent, are required to form appreciable quantities of the diester or diamide derivatives, especially with the higher alcohols and higher amines. The reaction to form either the partial ester or amide is generally conducted in a diluent medium, at temperatures of 100° C. or lower, more preferably at 50 to 80° C. The esterification reaction is facilitated by the addition of very small amounts of a strongly alkaline amine such as pyridine, or other alkaline catalyst. When it is desired to convert substantially all of the anhydride groups to the half ester, which is not necessarily desirable, a fairly large excess of up to 2 or 3 equivalent proportions of alcohol is required.

The partial amide is much more easily formed, the natural tendency of the interpolymers being to form an amide-salt directly when one equivalent of amine is supplied for each equivalent of carboxyl in the polymer, that is, two equivalents of amine for each equivalent of anhydride. In general, when complete neutralization is desired, a slight excess of amine is desirable, usually not more than a 25% excess. Like the esterification reaction above, heating facilitates the reaction and it is preferred to suspend the insoluble interpolymer in a liquid diluent, most preferably an organic solvent such as benzene, toluene, hexane, etc., which has a slight tendency to swell the insoluble interpolymer. Liquid aromatic hydrocarbons are the preferred diluents. Heating the reaction mixture at 25 to 100° C. insures completeness of reaction.

In preparing the partial-ester and partial-amide derivatives, any alcohol or amine may be utilized, although to prevent additional cross-linking (which results in de-swelling or loss of hydrophilic properties) by transesterification and/or diamide formation, it is preferred to utilize an alcohol or amine containing not more than one hydroxyl or amino group. The lower monohydric alcohols and monobasic amines produce more highly hydrophilic derivatives, while the higher alcohols and amines produce derivatives having higher viscosity and increased emulsifying and stabilizing power, particularly for water-immiscible organic liquids. The choice of the particular alcohol or amine, therefore, depends on the balance desired in the final derivative between hydrophilic properties (such as degree of swell), viscosity, suspending, stabilizing or dispersing properties, and hydrophobic properties such as the ability to emulsify oils and to stabilize emulsions. In general, aliphatic monohydric alcohols containing from 1 to 18 carbon atoms and primary and secondary amines, not necessarily aliphatic in nature, containing from 1 to 18 carbon atoms may be utilized. Illustrative alcohols include methyl, ethyl, propyl, n-butyl, and secondary butyl, hexyl, heptyl, octyl, 2-ethylhexyl, decyl and lauryl, myristyl, octadecyl, and cyclohexyl alcohols. Illustrative amines include methyl, ethyl, propyl, n-butyl, octyl, decyl and lauryl amines, dimethyl amine, dibutyl amine, dioctyl amine, dilauryl amine, aniline, monomethyl aniline, naphthylamine, cyclohexyl amine, dicyclohexyl amine, o-toluidine, diphenyl amine, sulfanilic acid, pyrrole, piperidine and many others.

The following specific examples, which are merely illustrative of the invention, will demonstrate the preparation of illustrative polymers, derivatives thereof and various manners of utilizing them in the preparation of mucilaginous compositions.

EXAMPLE I

A series of terpolymers were prepared by reacting molar equivalents of maleic anhydride and methyl vinyl ether with amounts of allyl sucrose varying from about 0.01% to about 10% by weight based on the combined weight of maleic anhydride and methyl vinyl ether. The allyl sucrose had an average of 5.6 to 5.8 allyl groups on each sucrose molecule. The polymerization reactions were carried out in glass equipment at autogenous pressure and under conditions that were as uniform as possible. In each instance the ingredients were blended in benzene at room temperature, the reactor sealed and then the temperature was adjusted to 50° C.–100° C. for periods of time ranging from about 12 to 24 hours. A free radical catalyst, benzoyl peroxide, at a concentration of 1.0% based on the combined weight of maleic anhydride and methylvinyl ether was employed.

The polymers formed as finely divided white particles which were insoluble in benzene. After the polymerization reaction is complete the polymers can be readily filtered and dried, without apparent change in any of the water-sensitive characteristics such as mucilage forming ability of the partial salts, ester-salts and partial amide-salts or viscosity of the polymer derivative in water, etc.

Portions of each filtered polymer were treated with aqueous sodium carbonate to convert about 75% of the carboxyl or carboxyl forming groups to sodium salts. Thereafter, aqueous mucilages having from about 0.5 to about 1.50% by weight of polymeric salt were prepared and the viscosity determined on a Brookfield R.V.F. viscosimeter, with a number 7 spindle at 20 r.p.m., and reported as poises except as otherwise indicated.

The table below shows the differences between the partial salts of the several polymers at various levels in water.

Table I

| Parts allyl sucrose in polymer | Viscosity in poises at different polymer levels in water | | |
|---|---|---|---|
| | 1.5% | 1.0% | 0.5% |
| 0.01 | [1] 80 | | |
| 0.5 | 280 | 220 | 144 |
| 1 | 360 | 332 | 260 |
| 2.5 | 1,760 | 1,600 | 880 |
| 3 | 1,360 | 1,200 | 800 |
| 4 | 2,320 | 1,840 | 960 |
| 5 | 3,840 | 2,560 | 400 |
| 6 | 120 | 320 | 20 |
| 8 | 56 | 4 | |
| 10 | [1] 600 | | |

[1] Centipoises.

These polymers have a maximum swelling capacity and highest viscosity in water at approximately 75% neutralization, and were selected for purposes of comparison for that reason.

It is to be understood, however, that a desired viscosity in a mucilage can be obtained by several other means, including the regulation of the amount of polymer in water, controlling the degree of neutralization and adjusting the amount of cross-linking in a polymer by increasing or decreasing the amount of a particular cross-linking agent that is added to the monomeric mixture. In addition the average number of allyl or other reacting polymerizable groups on the cross-linking monomer and the nucleus of the cross-linking monomer have some bearing on the viscosity of the polymer in water.

Esters of the acid anhydride form polymers of Example I were prepared by reacting various alcohols with the polymer.

The alcohol was added directly to the benzene-solid polymer slurry and it was found that esterification is effected between the solid polymer and the alcohol without conversion of the original polymer or its partial ester derivative into a benzene soluble state.

The preferred method of preparing the esters of this invention is to add the alcohol and a trace of an esterification catalyst, such as pyridine or other liquid, benzene-soluble tertiary amine, to the slurry of benzene and acid anhydride form polymer and then heat the mixture to about 70° C. for about 2 to 24 hours.

The molar proportions of alcohol to carboxyl or carboxyl forming groups can vary over a range of from about 0.1 to about 2.5, depending on the degree of esterification desired in the final product. However, even with an excess of alcohol the anhydride group of the polymer does not react with substantially more than one mole of alcohol to form a half-ester.

EXAMPLE II

For comparison of the partial salt and the ester derivatives the polymer prepared with equimolar proportions of maleic anhydride and methyl vinyl ether, and 1 part by weight, based on the above mentioned monomers, of allyl sucrose was esterified with 1 molar equivalent of normal primary alcohols having from 1 to 14 carbon atoms and 0.4 equivalents of octadecyl alcohol. The esters were prepared by the preferred method described above. After esterification the polymer derivatives were filtered from the benzene, dried and the remaining carboxyl groups were neutralized with aqueous sodium carbonate to convert about 75% of the acid groups to salts. The table below shows the viscosities of the partial ester-salts in water.

Table II

| Percent polymer in water | Viscosity of polymer in water—number of carbon atoms in alcohol group of ester | | | | | | | | | | | | |
|---|---|---|---|---|---|---|---|---|---|---|---|---|---|
| | 1 | 2 | 3 | 4 | 5 | 6 | 7 | 8 | 9 | 10 | 12 | 14 | 18 |
| 1.5 | 96 | 96 | 104 | 112 | 96 | 120 | 192 | 240 | 328 | 596 | 400 | 560 | 880 |
| 1.0 | 64 | 72 | 72 | 80 | 80 | 64 | 112 | 96 | 192 | 440 | 304 | 400 | 520 |
| 0.5 | 40 | 40 | 48 | 48 | 40 | 40 | 64 | 48 | 80 | 320 | 160 | 216 | 240 |

The viscosities were determined on a Brookfield R.V.F. viscosimeter with a #7 spindle at 20 r.p.m.

An emulsion of 60 parts by weight of mineral oil and 100 parts by weight of water was prepared with ½ part by weight of a polymer salt of Example I, having an allyl sucrose content of 1%. The emulsion was prepared by mixing the ingredients in a mortar and passing the mixture through a manually operated homogenizer. The partial ester-salts and partial amide-amine salts can also be used to prepare the emulsions as described above. Thereafter each emulsion-polymer salt or polymer derivative mixture was centrifuged at 2,000 r.p.m. for 10 minutes in a fixed angle centrifuge. At the end of this period all the emulsions were stable. The viscosity of the stabilized emulsion also is increased and the degree of increase in viscosity becomes greater as the chain length of the alcohol is increased.

A similar test was made with an emulsion made of 30 parts heptane and 70 parts of water. The results showed that the esters in which the alcohol had seven carbon atoms or more were excellent emulsion stabilizers, while the esters with alcohols having less than 7 carbon atoms were less effective but still useful as emulsion stabilizers under the conditions of this test.

Analysis of the polymeric partial esters formed by treating the acid anhydride form polymer with one equivalent of alcohol showed that about 45% of the carboxyl groups were esterified.

EXAMPLE III

Another group of partial esters was prepared with the acid anhydride form polymer having 5% allyl sucrose as a cross-linking agent. In this series, the esterification temperature was 50° C. and the remainder of the procedure was similar to that described above. The resulting partial ester-salts formed very highly viscous mucilages in water. The table below shows the results obtained on these samples.

Table III

| Alcohol: | Calculated equivalent reacted |
|---|---|
| Methanol | 1.0 |
| n-Butanol | 1.0 |
| n-Octanol | 0.8 |
| Laurylalcohol | 0.8 |
| Octadecanol | 0.9 |

EXAMPLE IV

A series of partial esters, with varying amounts of methanol were prepared from an acid anhydride form polymer of maleic anhydride and methyl vinyl ether and 1 part of allyl sucrose, as described in Example I. Table IV shows the results of the derivatives formed in this reaction.

Table IV

| Equivalents of methanol | 0.2 | 0.4 | 0.6 | 0.8 | 1.0 | 1.2 | 1.4 | 1.6 |
|---|---|---|---|---|---|---|---|---|
| Brookfield RVF Viscosity—Percent polymer in water: | | | | | | | | |
| 1.5 | 240 | 200 | 176 | 144 | 160 | 160 | 208 | 120 |
| 1.0 | 160 | 176 | 144 | 80 | 105 | 80 | 130 | 80 |
| 0.5 | 120 | 100 | 80 | 56 | 80 | 48 | 80 | 40 |
| Percent methanol reacted | 1.47 | 32.7 | 49.8 | 47.05 | | | | |

It is apparent from these data that the viscosity of a mucilage does not vary greatly with an increase in the esterification level. Nevertheless, the polymer having only 1.47% ester was an excellent emulsifying agent for mineral oil and water.

EXAMPLE V

The same anhydride form polymer as that employed in Example IV was used to prepare a series of lauryl alcohol partial esters in which the degree of esterification was varied. Table V shows the data of these tests.

Table V

| Equivalents of lauryl alcohol | 0.1 | 0.2 | 0.3 | 0.4 | 0.5 | 0.6 | 0.7 | 1.5 |
|---|---|---|---|---|---|---|---|---|
| Brookfield RVF viscosity—Percent polymer in water: | | | | | | | | |
| 1.5 | 344 | 688 | 800 | 880 | 880 | 720 | 640 | 624 |
| 1.0 | 136 | 264 | 352 | 352 | 336 | 320 | 246 | 440 |
| 0.5 | 56 | 80 | 144 | 144 | 176 | 136 | 144 | 288 |
| Percent alcohol reacted | Trace | 4.7 | 7.1 | 11.8 | 17.4 | 22.9 | 30 | 49 |

The results with a long chain alcohol are somewhat parallel to those obtained with methanol in that increasing the amount of alcohol causes a greater percentage of esterification, but there are no radical differences in viscosity due to the ester linkages. Further even a trace of esterification shows great improvement in emulsifying ability, since the polymer after treatment with 0.1 equivalents of lauryl alcohol served as an excellent emulsifier for a 30:70 hexane-water mixture.

EXAMPLE VI

In order to determine the effect of various levels of cross-linking agent, a series of partial esters were prepared by reacting polymers having various percentages of allyl sucrose with one molar equivalent of methanol. The results of this reaction are tabulated below.

Table VI

| Percent allyl sucrose in polymer | 0.5 | 1.0 | 1.5 | 2.0 | 2.5 | 3.0 | 3.5 | 4.0 |
|---|---|---|---|---|---|---|---|---|
| Methanol equivalents | 1 | 1 | 1 | 1 | 1 | 1 | 1 | 1 |
| Brookfield RVF viscosity—Percent polymer in water: | | | | | | | | |
| 1.5 | 200 | 320 | 520 | 1,160 | 920 | 960 | 2,240 | 2,880 |
| 1.0 | 120 | 176 | 360 | 800 | 720 | 720 | 1,600 | 2,320 |
| 0.5 | 64 | 96 | 240 | 200 | 480 | 480 | 400 | 720 |
| Percent methanol reacted | 61.7 | 53.3 | 55.1 | 58.4 | 54.0 | ----- | 52.6 | 47.1 |

The data indicate that the levels of cross-linking agent has little effect on the degree of esterification under a given set of reaction conditions, but the viscosity of the partial esters is significantly increased with an increase in the level of cross-linking agent employed in preparing the initial terpolymer.

With alcohols higher than methanol a parallel effect is obtained, but there is a gradual shift toward increased viscosity with an increase in carbon atoms of the alcohol used for esterification.

EXAMPLE VII

It is not necessary to use primary alcohols or even aliphatic alcohols to prepare the partial esters of this invention. Secondary alcohols, tertiary alcohols, substituted alcohols, aromatic compounds with a hydroxyl group attached to a ring carbon atom, aralkanols and mixtures of aliphatic and aromatic alcohols can be used to esterify the acid form polymer to produce mucilage forming derivatives. The method used in preparing the derivative is the same as that under Example II. Table VII shows the results of these experiments.

Table VII

| Alcohol used for esterification | Molar Equivalents | Viscosity of mucilage percent polymer in water | | |
|---|---|---|---|---|
| | | 1.5 | 1.0 | 0.5 |
| Isopropyl | 1 | 480 | 400 | 300 |
| t-Butyl | 1 | 640 | 560 | 460 |
| Benzyl | 1 | 3,216 | 2,464 | 1,328 |
| Ethylene glycol monomethyl ether | 1 | 460 | 300 | 188 |
| Cyclo hexyl | 1 | 176 | 144 | 64 |
| Methyl-salicylate | 1 | 900 | ----- | ----- |
| Phenol-methanol mixture (50:50 molar conc.) | 1 | 72 | 52 | 32 |
| Ethylene chlorohydrin | 1 | 240 | 136 | 64 |

Each of the partial esters was tested as a stabilizer for mineral oil in water emulsions and each was found to be well suited for this purpose.

EXAMPLE VIII

The acid anhydride form of the polymer also reacts with alcohols having tertiary amine groups to form unusual derivatives from which mucilages having amphoteric properties with good stability at low pH values and relative insensitivity to polyvalent cations. In Table VIII are listed a series of such polymeric derivatives of alcohols having tertiary amino linkages. The acid-form polymer used to prepare the derivatives was a maleic anhydride, methyl vinyl ether, allyl sucrose copolymer containing 1% allyl sucrose. In preparing these derivatives, no esterification catalyst is needed since the amino group of the alcohol acts as the catalyst, and the reaction proceeds smoothly at room temperature within a few minutes.

Table VIII

| Alcohol | Alcohol equivalent | Viscosity percent polymer in water | | | pH of 1.5% mucilage |
|---|---|---|---|---|---|
| | | 1.5 | 1.0 | 0.5 | |
| 2-dimethylamino ethanol | 1 | 360 | 320 | 88 | 4.8 |
| 2-diethylamino ethanol | 1 | 620 | 304 | 148 | 4.7 |
| 1-dimethylamino propanol | 1 | 740 | 180 | 100 | 4.0 |
| 2-di n-butylamino ethanol | 1 | 500 | 320 | 160 | 4.9 |
| 8-hydroxy quinoline | 1 | 80 | 64 | 48 | 3.45 |
| n-Hydroxyethyl morpholine | 1 | 200 | 120 | 80 | ----- |

In order to illustrate the effect of variation in pH, viscosity determinations of 1% mucilage were made on the 2-diethylamino ethanol derivatives and the 8 hydroxy quinoline derivatives of the polymer. These results are tabulated below.

Table IX

| 2-diethylaminoethanol derivative | | 8-hydroxyquinoline derivative | |
|---|---|---|---|
| pH | Viscosity of 1% polymer in water | pH | Viscosity of 1% polymer in water |
| 3.80 | 144 | 2.2 | 8 |
| 4.52 | 204 | 2.9 | 24 |
| 5.12 | 256 | 3.2 | 48 |
| 5.35 | 200 | 3.45 | 64 |
| 7.87 | 224 | 3.8 | 84 |
| 8.18 | 240 | 5.0 | 88 |
| 8.82 | 248 | 7.2 | 88 |
| 9.04 | 236 | 8.38 | 84 |
| | | 9.6 | 76 |
| | | 10.1 | 68 |

The acid form polymer from which these derivatives were made had its maximum viscosity at a pH range of 5 to 7. Below pH 5 the acid form polymer tends to flocculate and above pH 7 it gradually tends to lose its viscosity and deswell in water.

To illustrate the effect of polyvalent ions, relative viscosity of mucilages of the acid form polymer 75% neutralized with sodium hydroxide and the 2-diethylamino ethanol derivative of the unneutralized polymer, as described in Table VIII, are tabulated below.

*Table X*

Relative viscosity of acid form polymer and its 2-diethylamino derivative.

| Polymer | Viscosity in water | Relative 1 N $CaCl_2$ | Viscosity 0.1 N $CaCl_2$ | 0.01 $CaCl_2$ |
|---|---|---|---|---|
| Acid form | 700 poises | 0.0 | 0.4 | 1.0 |
| 2-diethylamino ethanol derivative | 204 | 0.42 | 2.12 | 1.15 |

From these data it is readily apparent that deswelling of the mucilage is much less serious with the amphoteric polymer than with the partial sodium salt of the acid-form polymer, and that the presence of polyvalent cations in proper proportions actually improves the swelling of the particular polymer.

Although I have described above only polymers having molar equivalents of tertiary amino alcohols reacted with the acid-form polymer it is to be understood that smaller or larger quantities will also react with the acid anhydride form polymer to yield desirable derivative polymers. It is believed that the tertiary amino alcohols react with the anhydride group in accordance with the following general equation:

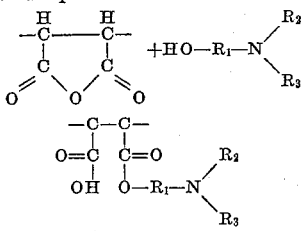

Thus, half the carboxyl or potential carboxyl groups are free to react with additional tertiary amine alcohols or form salts.

The anhydride group of the acid-form polymer also reacts with ammonia or primary and secondary amines to form amides and amino salts which are also good amphoteric emulsion stabilizers with relatively low sensitivity to polyvalent cations. This reaction is believed to proceed in accordance with the following general equation:

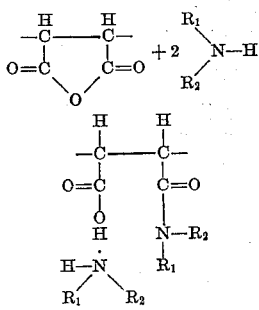

The partial amides can be readily prepared by adding ammonia, a primary amine or a secondary amine to the benzene slurry containing the acid anhydride form polymer. The reaction proceeds rapidly and smoothly at room temperature without a catalyst and is usually complete in less than an hour. The parent polymer as well as its amide derivatives remain in a solid, flocculated state during the entire course of the reaction.

EXAMPLE X

A series of amines having at least one hydrogen atom attached to the amino nitrogen atom were reacted with an acid anhydride form polymer which was prepared with equimolar proportions of maleic anhydride and methyl vinyl ether. The polymer was cross-linked with 1% of allyl sucrose, based on the combined weight of the maleic anhydride and methyl vinyl ether. The reaction with the amine in each instance was run by adding from one to two molar equivalents of amine to a slurry of acid anhydride form polymer in benzene. The mixture was stirred for about one hour at room temperature.

| Amine | Molar equivalents | Color of polymer | Viscosity of partial amide percent polymer in water | | | Percent $N_2$ in polymer |
|---|---|---|---|---|---|---|
| | | | 1.5 | 1.0 | 0.5 | |
| Methyl amine | 2 | Brown | 420 | 400 | 380 | 1.9 |
| Dimethylamine | 2 | do | 360 | 280 | 135 | 8.22 |
| Aniline | 1 | do | 440 | 350 | 250 | 1.11 |
| Cyclohexylamine | 2 | White | 80 | 52 | 40 | |
| Piperidine | 2 | Brown | 100 | 80 | 56 | |
| Ammonia | 2 | White | 660 | 460 | 260 | 13.1 |

These data show that aliphatic, aromatic, alicyclic and heterocyclic amines are operative in this reaction.

Aniline and other amines in which the amino group is attached directly to a nuclear carbon atom of an aromatic ring are rather unique in their reaction, in that amines of this type react readily with the anhydride group of maleic anhydride to form a partial amide, but the free carboxy group does not form salts with the amine.

The partial amides are excellent suspending agents and emulsion stabilizers, especially in systems which contain polyvalent cations and those in which there is a relatively wide fluctuation of pH. They can also be used as adhesives.

The viscosity of the partial amides in water can be readily altered by regulating the amount of cross-linking agent used in preparing the polymer.

Substituted maleic anhydrides can be used to replace maleic anhydride in whole or in part in preparing the useful polymers of this invention.

Water-sensitive polymers can be prepared with molar equivalents of halo-substituted maleic anhydride and at least one other monomer that copolymerizes with the substituted maleic anhydride, together with any of the cross-linking agents of this invention. The method used to prepare the water-sensitive polymers of substituted maleic anhydrides is substantially the same as that for polymers containing maleic anhydride.

EXAMPLE XI

| Ingredient | Parts by weight | |
|---|---|---|
| | A | B |
| Chloromaleic anhydride | 69.6 | |
| Citraconic anhydride | | 66 |
| Methyl vinyl ether | 30.4 | 34 |
| Allyl sucrose | 6 | 6 |
| Benzoyl peroxide | 2 | 2 |
| Benzene | 880 | 880 |
| Temperature ° C | 50 | 50 |
| Time, hours | 16 | 16 |
| Percent yield | 95 | 87 |

The polymers were filtered and dried at 50° C. in a vacuum oven for 24 hours.

Polymer A had a light tan color. A 1.5% aqueous mucilage of the partial salt having 75% of the carboxyl groups neutralized with NaOH had a Brookfield R.V.F. viscosity of 4 poises as determined with a #7 spindle at 20 r.p.m.

Polymer B was white. A 1.5% aqueous mucilage of the 75% neutralized sodium salt had a Brookfield viscosity of 16 poises.

It is to be understood that other substituted maleic anhydrides can be employed in place of those specifically described. The acid anhydride forms of the polymers also undergo reactions with alcohols, ammonia and primary and secondary amines to form partial esters and amides.

Other comonomers can be copolymerized with maleic anhydride and substituted maleic anhydrides and a cross-linking agent to form water-sensitive alkali metal salts, partial esters and amides.

EXAMPLE XII

In this series of polymers various comonomers were copolymerized with maleic anhydride and allyl sucrose.

| Ingredient | Parts by weight | | | | |
|---|---|---|---|---|---|
| | A | B | C | D | E |
| Maleic anhydride | 40-20 | 53 | 20 | 50 | 50 |
| Vinyl acetate | 60-80 | | | | |
| Methyl acrylate | | 47 | | | |
| Acrylic acid | | | 80 | | |
| Vinyl n-butyl ether | | | | 50 | |
| Vinyl 2-Methoxy ethyl ether | | | | | 50 |
| Allyl sucrose | 4 | 3 | 1 | 4 | 3 |
| Benzoyl peroxide | 2 | 2 | 2 | 1 | 2 |
| Benzene | 880 | 880 | 880 | 880 | 880 |
| Temperature, °C | 50 | 50 | 50 | 50 | 50 |

The partially neutralized (75%) alkali metal salts of these polymers form excellent mucilages in water. In addition, partial esters and partial amides, as described hereinbefore, can be prepared with alcohols mentioned above ammonia and amines having at least one hydrogen atom attached directly to the amine nitrogen.

The derivatives of the 60-40 maleic anhydride, vinyl acetate, allyl sucrose copolymer of this example had the following properties:

| Reactant | Molar equiv-alent | Brookfield viscosity (poises) percent polymer in water | |
|---|---|---|---|
| | | 1.5 | 1.0 |
| Methanol | 1 | 64 | 8 |
| Aniline | 1 | 40 | 4 |
| n-Octyl alcohol | 1 | (¹) | |
| Dimethylamine | 1 | 0.056 0.43 | |

¹ Intrinsic viscosity.

The partial esters were prepared at a temperature of 70° C. with a trace of pyridine as a catalyst, and the amides were formed at 30° C. without a catalyst. Nitrogen analysis showed that all of the amine reacted with the anhydride and carboxyl group.

A copolymer of 20 parts maleic anhydride, 80 parts of acrylic acid and 1 part allyl sucrose was also prepared and esterified and amidified with the following alcohols and amines.

| Reactant | Molar equiva-lent | Brookfield viscosity percent polymer in water | | |
|---|---|---|---|---|
| | | 1.5 | 1.0 | 0.5 |
| Lauryl alcohol | 1 | 248 | 176 | 60 |
| Isopropyl amine | 1 | 160 | 48 | 16 |

The amine derivative had a nitrogen content of 1.2% which is an indication that about 26.2% of the anhydride groups were reacted.

Amine and ester derivatives of the maleic anhydride, vinyl 2-methoxy ethyl ether, allyl sucrose copolymer had the following properties:

| Reactant | Molar equiva-lent | Brookfield viscosity percent polymer in water | | |
|---|---|---|---|---|
| | | 1.5 | 1.0 | 0.5 |
| Methanol | 1 | 420 | 200 | 40 |
| Dimethyl amine | 2 | 164 | 44 | 4 |

The amine derivative had a nitrogen content of 7.95% indicating that about 81% was reacted to form amide and amine salts with the anhydride linkage.

EXAMPLE XIII

Polyallyl ethers of other saccharine polyalcohols are also excellent cross-linking agents. Polymers cross-linked with compounds of this type are tabulated below. In each instance the polymer was prepared by copolymerizing equimolar proportions of maleic anhydride and methyl vinyl ether, and the polyallyl compound in benzene solution with a benzoyl peroxide catalyst.

| Cross linking agent | Per-cent | 75% Na salt in water Brookfield viscosity percent polymer in water | | |
|---|---|---|---|---|
| | | 1.5 | 1.0 | 0.5 |
| Allyl starch | 1.5 | 240 | 160 | 100 |
| Allyl sorbitol | 1.5 | 680 | 600 | 500 |
| Allyl pentaerythritol | 1.5 | 520 | 500 | 360 |
| Allyl inositol | 1.5 | 1,000 | 860 | 800 |
| Allyl raffinose | 1.5 | 850 | 700 | 520 |

In addition to the salts, partial esters, and partial amides formed by reacting the polymer with alcohols, ammonia, primary and secondary amines can also be formed. The polymers of this example have characteristics that are quite similar to those prepared by using allyl sucrose as a cross-linking agent. It is to be understood that other allyl ethers of polyalcohols having at least 3 hydroxyl groups can be used in place of the allyl derivatives specifically mentioned above.

In addition to the allyl ethers certain other polyunsaturated compounds can be employed as cross-linking agents when copolymerized with maleic anhydride and vinyl methyl ether. Particularly desirable cross-linking agents of this type include methylene bis-acrylamide, hexaallyl trimethylene trisulfone di, tri and tetrallyl pentaerythritol and trimethacrylyltriazine. Each of these cross-inking agents produces polymers having characteristics that are highly suitable for use as synthetic gums in aqueous systems.

EXAMPLE XIV

A series of copolymers were prepared with molar equivalents of maleic anhydride and methyl vinyl ether cross-linked with varying amounts of methylene- bis-acrylamide. In each instance the water-sensitive, cross-linked polymer was prepared by the method of Example I.

Aqueous mucilages of the 75% sodium salts were prepared and the viscosities were determined on a model R.V.F. Brookfield viscosimeter using a number 7 spindle at 10 r.p.m. The table below shows the proportion of ingredients used in preparing the polymers and the viscosity of the mucilages made with various amounts of the partial salt in water.

| Ingredient | Parts by weight | | | | | |
|---|---|---|---|---|---|---|
| | A | B | C | D | E | F |
| Maleic anhydride | 62.8 | | | | | |
| Methyl vinyl ether | 37.2 | | | | | |
| Methylene-bis-acrylamide | 1 | 2 | 3 | 4 | 5 | 6 |
| Benzoyl peroxide | 1 | | | | | |
| Benzene | 880 | | | | | |

| Percent polymer salt in mucilage | Brookfield viscosity | | | | | |
|---|---|---|---|---|---|---|
| 1.5 | 360 | 920 | 1,800 | 1,120 | 2,160 | 1,010 |
| 1.0 | 280 | 720 | 1,520 | 640 | 1,520 | 360 |
| 0.5 | 160 | 280 | 720 | 48 | 160 | 24 |

Partial esters and partial amide-amine salts can be prepared from the acid anhydride form of the above polymers. The table below shows the characteristics of a lauryl alcohol partial ester. The mucilage viscosity was taken on a Brookfield R.V.F. viscosimeter using a number 7 spindle at 10 r.p.m.

| Percent ester-salt in water | Viscosity | | | | |
|---|---|---|---|---|---|
| | A | B | C | D | F |
| 1.5 | 384 | 920 | 1,600 | 2,240 | 3,200 |
| 1.0 | 296 | 640 | 1,280 | 2,160 | 2,800 |
| 0.5 | 128 | 480 | 880 | 920 | 288 |

These partial esters were prepared with 0.25 equivalent of laurylalcohol, based on the anhydride groups of the resin in a benzene slurry. A trace of pyridine was employed as a catalyst. The partial esters are excellent emulsifying agents for making heptane-water emulsion.

Amide-amine salts can also be prepared by using ammonia, a primary amine or a secondary amine.

EXAMPLE XV

The acid anhydride form polymer prepared by reacting molar equivalents of maleic anhydride, methyl vinyl ether and 1 part based on the remaining monomers of methylene-bis-acrylamide was reacted with various molar equivalents of menthanol and water. Mucilages of the partial esters were prepared.

| Percent polymer in water | Molar equivalents of methanol | | | | | | | |
|---|---|---|---|---|---|---|---|---|
| | 0.2 | 0.4 | 0.6 | 0.8 | 1.0 | 1.2 | 1.4 | 1.6 |
| | Brookfield viscosity | | | | | | | |
| 1.5 | 480 | 480 | 352 | 384 | 384 | 430 | 448 | 544 |
| 1.0 | 304 | 440 | 320 | 336 | 320 | 384 | 400 | 512 |
| 0.5 | 240 | 320 | 256 | 256 | 240 | 272 | 304 | 352 |

These polymers are excellent thickening agents. Emulsions and mucilages made with these polymers are very smooth.

EXAMPLE XVI

A cross-linked polymer was prepared with molar equivalents of maleic anhydride and vinyl-n-butyl ether using methylene-bis-acrylamide as the cross-linking agent. The cross-linked polymer was treated with 1 molar equivalent of various alcohols to form partial esters prior to making viscosity determination. The partial esters were further neutralized by converting about 75% of the remaining carboxyl groups to sodium salts. The table below shows the properties of ingredients and the viscosities of the partial ester-salts.

Ingredient: Parts by weight
Maleic anhydride_____ 50
Vinyl-n-butyl ether_____ 50
Methylene-bis-acrylamide _____ 4
Benzoyl peroxide_____ 1

Partial esters and partial amides were prepared by adding an alcohol or an amine to the benzene slurry of the anhydride form polymer.

| Alcohol | Parts by weight | Viscosity of 1.5% mucilage |
|---|---|---|
| Methanol | 16.4 | 92 |
| N-octyl alcohol | 66.4 | 10 |

The polymer and partial esters were prepared in benzene.

EXAMPLE XVII

Methylene-bis-methacrylamide can also be used as a cross-linking agent for maleic anhydride-alkyl vinyl ether copolymers. A series of cross-linked polymers were prepared in benzene in accordance with the recipes below.

| Ingredient | Parts by weight | | | | |
|---|---|---|---|---|---|
| Maleic anhydride | 62.8 | | | | |
| Methyl vinyl ether | 37.2 | | | | |
| Methylene-bis-methacrylamide | 0.5 | 1.0 | 2.0 | 3.0 | 4.0 | 6.0 |
| Benzoyl peroxide | 1.0 | | | | |
| Brookfield RVF viscosity—Percent polymer in water mucilage: | | | | | |
| 1.5 | 96 | 240 | 716 | 916 | 524 | 264 |
| 1.0 | 72 | 200 | 440 | 464 | 320 | 240 |
| 0.5 | 48 | 112 | 160 | 136 | 56 | 48 |

The viscosities were run on a 75% neutralized sodium salt of the polymers.

Partial esters and partial amides can be prepared from the polymers cross-linked with methylene-bis-acrylamide and methylene bis-methacrylamide by treating the polymer with an alcohol or ammonia, a primary or a secondary amine in a benzene slurry. This reaction will occur although the polymer remains in the solid state at all times. The partial esters can be reacted further with alkali metal salts, hydroxides and oxides to form compositions which yield highly viscous mucilages in water. The partial amide-amine salts usually require no additional treatment to produce highly viscous musilages in water.

EXAMPLE XVIII

Another excellent cross-linking agent is hexaallyl trimethylene trisulfone. A series of polymers were formed with this compound in accordance with the formula below.

| Ingredient | Parts by weight | |
|---|---|---|
| Maleic anhydride | 62.8 | 62.8 |
| Methyl vinyl ether | 37.2 | 37.2 |
| Hexaallyl trimethylene trisulfone | 2.0 | 4.0 |
| Benzoyl peroxide | 2.0 | 2.0 |
| Benzene | 880 | 880 |
| | Brookfield viscosity | |
| Percent polymer in water: | | |
| 1.5 | 240 | 320 |
| 1.0 | 160 | 280 |
| 0.5 | 80 | 200 |

These musilages were prepared from a 75% neutralized partial sodium salt of the polymer. The polymer made with 4% cross-linking agent makes an excellent suspending material in view of its flat viscosity v. concentration curve.

Partial esters and partial amides can also be prepared by reacting the acid anhydride form polymer with the proper alcohol or ammonia a primary amine or a secondary amine.

One portion of the acid anhydride form of the polymer having 2% hexaallyl trimethylene trisulfone as a cross-linking agent was treated with 1 molar equivalent of methanol and the other part was reacted with aniline. The resulting partial ester-salts and partial amide-salts had the following viscosities in water.

| 2% cross-linking agent percent polymer in water | Derivative | |
|---|---|---|
| | Methanol | Aniline |
| 1.5 | 24 | 48 |
| 1.0 | 20 | 32 |
| 0.5 | 12 | 20 |

EXAMPLE XIX 1,3,5-triacrylyl triazine and 1,3,5-trimethacrylyl triazine yield cross-linked polymers with maleic anhydride and lower alkylvinyl ether.

| Ingredient | Parts by weight | |
|---|---|---|
| Maleic anhydride | 62.8 | 62.8 |
| Methyl vinyl ether | 37.2 | 37.2 |
| 1,3,5-triacrylyl triazine | 6.0 | |
| 1,3,5-trimethacrylyl triazine | | 6.0 |
| Benzoyl peroxide | 1.0 | 1.0 |
| Benzene | 880 | 880 |

| | Brookfield viscosity | |
|---|---|---|
| 75% neutralized polymer in water: | | |
| 1.5 | 280 | 1,232 |
| 1.0 | 240 | 1,216 |
| 0.5 | 26 | 944 |

The acid anhydride form polymer was prepared in benzene and thereafter was 75% neutralized with sodium carbonate. Each of the mucilages was smooth, but that containing the trimethacrylyl triazine was exceptionally so in this respect.

Partial esters and partial amides of the acid anhydride form polymer are readily prepared by treating the polymer with alcohol, ammonia, a primary amine or a secondary amine. The partial esters and partial amide-amine salts have properties which parallel those of the allyl-carbohydrate cross-linked derivatives. These partial esters and partial amide-amine salts are excellent emulsifying agents and emulsion stabilizers.

In addition to the cross-linked polymers specifically disclosed above other polyunsaturated compounds can be used as cross-linking agents. The table below enumerates a number of such materials which have been found useful for preparing water-sensitive cross-linked partial-ester-amide polymers.

| Example | Ingredient | Parts by weight | Partial | Partial amide |
|---|---|---|---|---|
| XX | Maleic anhydride<br>Methyl vinyl ether<br>Polybutadiene | 62.8<br>37.2<br>3 to 8 | Ethyl | Aniline. |
| XXI | Maleic anhydride<br>Methyl vinyl ether<br>Myrcene | 62.8<br>37.2<br>6.0 to 30 | Methyl | Isopropylamine. |
| XXII | Maleic anhydride<br>Methyl vinyl ether<br>Squalene | 62.8<br>37.2<br>6 to 30 | N-octyl | Dimethylamine. |
| XXIII | Maleic anhydride<br>Methyl vinyl ether<br>Laminac resin 4116[1] | 62.8<br>37.2<br>6.0 to 20 | Lauryl | Aniline. |
| XXIV | Maleic anhydride<br>Methyl vinyl ether<br>GE resin 2599[2] | 62.8<br>37.2<br>4 to 20 | Lauryl | Aniline. |

[1] Laminac 4116 resin is a liquid polyester of about 30% styrene and the remainder being maleic anhydride reacted with a glycol. The polyester has polymerizable unsaturated linkages.
[2] GE resin is a liquid polyester of maleic anhydride, a glycol and phthalic acid. The ratio of saturated to unsaturated acid is at lest 1 to 1. The polyester contains polymerizable unsaturated linkages.

All these polymers were prepared in the presence of benzoyl peroxide in about 880 parts of benzene at a temperature of 50° C.

Mucilages in water containing from about 0.5 to about 1.5% of these partial ester alkali metal salts and partial amide-amine salts stabilized oil in water emulsions.

EXAMPLE XXV

A polymer using molar equivalents of maleic anhydride and methyl vinyl ether with from 0.1 to 8 parts by weight of tetra allyl pentaerythritol was prepared in benzene by the method described in Example I. The partial salt 75% neutralized with sodium carbonate had the following viscosity characteristics as a mucilage.

| | Brookfield viscosity percent allyl pentaerythritol in polymer | | | | | |
|---|---|---|---|---|---|---|
| | 0.5 | 1.0 | 1.5 | 2.0 | 3.0 | 4.0 |
| Percent polymer salt in water: | | | | | | |
| 1.5 | 16 | 48 | 108 | 180 | 576 | 880 |
| 1.0 | 8 | 28 | 72 | 36 | 528 | 820 |
| 0.5 | | 8 | 44 | 104 | 408 | 580 |
| Percent partial methyl ester-salt in water: | | | | | | |
| 1.5 | 80 | 120 | 300 | 340 | 660 | 1,640 |
| 1.0 | 40 | 88 | 260 | 288 | 620 | 1,200 |
| 0.5 | 16 | 48 | 200 | 240 | 500 | 520 |
| Percent partial lauryl ester-salt in water: | | | | | | |
| 1.5 | 220 | 400 | 540 | 770 | 1,320 | 3,280 |
| 1.0 | 140 | 248 | 440 | 640 | 1,080 | 1,760 |
| 0.5 | 80 | 160 | 320 | 520 | 500 | 720 |

The partial esters of this example were made by reacting a slurry of the anhydride form of the polymer in benzene with one molar equivalent of alcohol. Partial amide-amine salts can be readily prepared by treating the acid anhydride form polymer with a nitrogen compound having at least one active hydrogen attached to the nitrogen atom.

EXAMPLE XXVI

A cross-linked polymer was made by reacting acrylic acid with from 0.5 to 6 parts by weight of N,N diallyl acrylamide. Mucilages of the 75% sodium salts in water had the following properties:

| Percent polymer salt in water | Brookfield viscosity percent N,N diallyl acrylamide | | | | | |
|---|---|---|---|---|---|---|
| | 0.5 | 1.0 | 2.0 | 3.0 | 4.0 | 4.5 |
| 1.5 | 180 | 360 | 1,880 | 720 | 600 | 172 |
| 1.0 | 144 | 320 | 1,560 | 380 | 240 | 32 |
| 0.5 | 100 | 300 | 520 | 72 | 16 | |

A 75% neutralized copolymer of molar equivalents of maleic anhydride and methyl vinyl ether, cross-linked with 4 parts of N,N diallyl acrylamide had a mucilage viscosity of 8 poises.

Partial esters and partial amides of these polymers can be prepared by reacting them with alcohols, ammonia, primary or secondary amines. The ester and amide derivatives are very good suspending and thickening agents.

EXAMPLE XXVII

The alcohols and amines used for preparing the derivatives with the anhydride form polymers can have substituents which will not react with the anhydride group, but which will contribute desirable properties to the polymeric derivative. Included among such compounds are sulfonated aliphatic alcohols which have a free hydroxyl group and phenol sulfonic acids. The plurality of sulfonate groups in the polymer chain adds the property of viscosity stability at high pH values and also reduces the sensitivity of the polymer to sodium chloride and other monovalent salts.

A copolymer of molar proportions of maleic anhydride and methyl vinyl ether, cross-linked with 1% by weight of allyl sucrose was reacted in its anhydride form in benzene with 1 molar equivalent of p-hydroxy benzene sulfonic acid. The 75% sodium salt of this derivative had the following characteristics:

Percent polymer salt in water:     Brookfield viscosity
  1.5 _____ 152
  1.0 _____ 64
  0.5 _____ 40

In order to check the viscosity stability of the polymer at various pH levels, partial salts having pH values of 8.4, 8.98 and 11.7 in a 1% concentration in water were prepared and found to have Brookfield viscosity values of 8, 64 and 64, respectively.

The stability of the polymer to sodium chloride was tested by preparing a mucilage containing 3% of the 75% neutralized salt in water. Sodium chloride was added to portions of the mucilage to yield concentration of sodium chloride of 1N, 0.1 N and 0.01 N. The original mucilage had a Brookfield viscosity of 320, while those containing sodium chloride at concentrations of 1 N, 0.1 N, and 0.01 N had viscosities of 16, 328 and 280, respectively. Thus it can be seen that mucilages which have good stability against salt-effects can be prepared.

The sulfur content of the polymer derivatives was 5.7% which indicates that about 87% of the anhydride groups reacted to form about 43.5% ester linkages with the anhydride of the polymer.

The aliphatic sulfonated alcohols with free hydroxyl groups react with the acid anhydride form polymer in the same manner as the aromatic alcohols.

The partial esters having a sulfonic acid side chain are excellent emulsifying, suspending and thickening agents.

A very important part of this invention is the method used in preparing the partial esters and partial amides. In preparing the acid anhydride form of the polymers in benzene, the cross-linked polymer invariably separates as a finely-divided, insoluble floc. On addition of an alcohol and a trace of a strongly alkaline amine catalyst to the benzene slurry the solid polymer is partially esterified without a change from the solid state of the polymer. The preferred reaction temperature is about 70° C., but a temperature of from about 20° C. to about the boiling point of the inert organic liquid medium can be used. If the high temperatures are employed the reaction should be carried out under reflux (about 118° C. to 125° C. is suitable). After permitting the reaction to proceed for about 1 to 24 hours, the solid partial ester is separated from the slurry and dried. The partial ester is not ordinarily self-dispersible in water, but upon partial neutralization of the carboxyl groups with an alkali, the partial ester readily forms a mucilage when blended with water. The neutralization can be effected in either the benzene, in the dry state or in water suspension.

The partial amides are more readily formed than the partial esters. No catalyst is usually necessary and the reaction proceeds smoothly at room temperature in a matter of minutes. It is not to be implied however, that lower or higher temperatures cannot be used. It is merely necessary to add ammonia, a primary or a secondary amine to a slurry of acid anhydride form polymer in the inert liquid organic reaction medium, such as benzene, in which the cross-linked polymer is formed. During the amide forming step the polymer always remains in a solid state. After the partial amide is formed it can be easily separated from the reaction medium by decantation, filtration or centrifuging. The best liquid medium found for these reactions is benzene, which is vastly superior to toluene or heptane.

The method can be employed for cross-linking a polymer having an anhydride linkage in the polymer chain by reacting the polymer with a saturated solution of a polyalcohol in benzene. The resulting partially neutralized derivative is water sensitive because only a limited amount of esterification takes place. Polymers of maleic anhydride and an alkyl ether or other comonomer or mixture of comonomers were prepared and cross-linked in benzene with ethylene glycol, polyethylene glycol, propylene glycol and other dihydric alcohols, glycerol, pentaerythritol, sorbitol and other polyols. The polyols have only a very limited solubility in benzene and for that reason only a portion of the anhydride linkages are reacted. Free carboxyl groups do not react with the polyol, and therefore, the carboxyl groups are available for salt formation which contributes to the water-sensitivity of the polymeric derivatives of this invention.

The polyunsaturated cross-linking agents are also useful for preparing cross-linked polyacrylic acid and copolymers of polyacrylic acid with one or more additional monomers.

| Example | Ingredient | Parts by weight | Viscosity of 1.5% mucilage—parts methylene-bis-acrylamide | | | | |
|---------|-----------|-----------------|---|---|---|---|---|
| | | | 1 | 2 | 3 | 5 | 6 |
| XXVII | Acrylic acid<br>Methylene-bis-acrylamide<br>Benzoyl peroxide<br>Benzene | 92-99<br>1 to 8<br>2<br>880 | 192 | 256 | 240 | 176 | 256 |
| | | | 1 | 2 | 3 | 4 | 5 |
| XXVIII | Acrylic acid 1,3,5-triacrylyl triazine<br>Benzoyl peroxide<br>Benzene | 92-99<br>2<br>880 | 24 | 32 | 23 | 80 | 120 |
| | | | 1 | 2 | 3 | 4 | |
| XXIX | Acrylic acid<br>1,3,5-trimethacrylyl triazine<br>Benzoyl peroxide<br>Benzene | 92-99<br>1 to 8<br>2<br>880 | 160 | 704 | 848 | 994 | |
| XXX | Methacrylic acid<br>Methylene-bis-acrylamide<br>Benzoyl peroxide<br>Benzene | 90-97<br>3-10<br>2<br>880 | | | ¹ 432 | | |
| | | | 1 | 2 | 3 | 4 | 5 | 6 |
| XXXI | Acrylic acid<br>Hexa allyl trimethylene trisulfone<br>Benzoyl peroxide<br>Benzene | 92-99<br>1 to 8<br>2<br>880 | 144 | 320 | 1,080 | 724 | 2,000 | 2,832 |
| | | | 1 | 2 | 4 | 5 | 6 |
| XXXII | Acrylic acid<br>Triallylcyanurate<br>Benzoyl peroxide<br>Benzene | 94-99<br>1-6<br>2<br>880 | 304 | 1,680 | 600 | 80 | 120 |

¹ 3 parts cross linking agent.

While I have disclosed with considerable detail certain preferred ways of practicing this invention, it is to be understood that the precise proportions of the materials may be varied and that other materials having properties equivalent to those disclosed can be used without departing from the spirit and scope of the invention, as defined in the claims.

I claim:

1. A composition compising a member selected from the class consisting of partial ester-partial amide, having from 1 to 18 carbon atoms in the ester group, partial amide-partial amine salts having from 1 to 18 carbon atoms in the amide group and partial amide-partial ammonium salt derivatives of an interpolymer of a monomeric mixture of from 20% to 62.8% by weight of (1) an alpha-beta olefinically unsaturated dicarboxylic acid anhydride, (2) from 30.4 to 80% by weight of at least one other monomer copolymerizable with said anhydride selected from the class consisting of vinyl alkyl ethers having from 3 to 10 carbon atoms, methyl acrylate, acrylic acid and vinyl acetate and (3) a cross-linking agent selected from the class consisting of (a) from .01 to 10% by weight of the combined weight of monomers defined under (1) and (2) of polyallyl sucrose, polyallyl sorbitol, polyallyl pentaerythritol, polyallyl inositol, polyallyl raffinose, polyallyl sulfones, trimethacrylyl triazine, triacrylyl triazine, triallyl cyanurate, methylene-bis-acrylamide, methylene-bis-methacrylamide, N,N'-diallylacrylamide, polybutadiene having a plurality of side $CH_2=CH$ groups, (b) from 6 to 30% of myrcene and squalene, and (c) from 4 to 20% of a liquid polyester of maleic anhydride and a glycol dissolved in styrene and a liquid polyester of maleic anhydride, phthalic anhydride and a glycol, said derivatives having substantially not more than one of said derivative linkages for each anhydride group.

2. The composition of claim 1 in which the alpha-beta olefinically unsaturated dicarboxylic acid anhydride is unsubstituted and has from 4 to 18 carbon atoms.

3. The composition of claim 1 in which the alpha-beta olefinically unsaturated carboxylic anhydride is maleic anhydride.

4. The composition of claim 2 in which the dibasic acid anhydride is maleic anhydride.

5. The composition of claim 3 in which the alkyl vinyl ether is methyl vinyl ether.

6. The composition of claim 3 in which the alkyl vinyl ether is n-butyl vinyl ether.

7. The composition of claim 3 in which the alcohol moiety of the partial ester is a primary alcohol.

8. The composition of claim 3 in which the alcohol moiety of the partial ester is a primary alcohol having a tertiary amine group.

9. The composition of claim 3 in which the amine moiety of the interpolymer derivative is a primary amine.

10. The composition of claim 3 in which the amine moiety of the interpolymer derivative is a secondary amine.

11. The composition of claim 3 in which the amide group of the interpolymer derivative is unsubstituted.

12. A composition comprising partial esters, partial amides, partial amide-partial amine salts and partial amide-partial ammonium salt derivatives of an interpolymer of substantially equimolar quantities of (1) an aliphatic alpha-beta olefinically unsaturated dibasic acid anhydride having from 4 to 18 carbon atoms (2) a vinyl alkyl ether having from 3 to 10 carbon atoms and (3) from 0.01 to about 10% by weight based on said interpolymerizable monomers of methylene-bis-acrylylamide as a cross-linking agent, said ester linkages having a monohydric alcohol moiety of from 1 to 18 carbon atoms and said amide moiety having from 0 to 18 carbon atoms, said ester derivatives having at least 1.47% of the anhydride groups converted to the half ester and said amide derivatives having at least 19.8% of anhydride groups converted to the half amide.

13. The composition of claim 12 in which methylene-bis-methacrylamide is the cross-linking agent.

14. The composition of claim 12 in which hexaallyltrimethylene trisulfone is the cross-linking agent.

15. The composition of claim 12 in which triallylcyanurate is the cross-linking agent.

16. The composition of claim 12 in which trimethacrylyltriazine is the cross-linking agent.

17. A method of preparing partial ester, partial amide-partial amine salt, and partial amide-partial ammonium salt derivatives of a cross-linked interpolymer of a monomeric mixture of from 20 to 62.8% by weight of (1) an alpha-beta olefinically unsaturated dicarboxylic anhydride, (2) from 30.4 to 80% by weight of at least one other monomer copolymerizable with said anhydride selected from the class consisting of vinyl alkyl ethers having from 3 to 10 carbon atoms, methyl acrylate, acrylic acid and vinyl acetate and (3) a cross-linking agent selected from the class consisting of (a) from .01 to 10% by weight of the combined weight of monomers defined under (1) and (2) of polyallyl sucrose, polyallyl sorbitol, polyallyl pentaerythritol, polyallyl inositol, polyallyl raffinose, polyallyl sulfones, trimethacrylyl triazine, triacrylyl triazine, triallyl cyanurate, methylene-bis-acrylamide, methylene-bis-methacrylamide, N,N'-diallyl acrylamide, polybutadiene having a plurality of side $CH_2=CH-$ groups, (b) from 6 to 30% of myrcene and squalene and (c) from 4 to 20% of a liquid polyester of maleic anhydride and a glycol dissolved in a styrene and a liquid polyester of maleic anhydride, phthalic anhydride and a glycol, comprising reacting the solid interpolymer in a liquid, nonsolvent organic medium for the interpolymer with a compound selected from the class consisting of ammonia, monoamines having at least one hydrogen atom on the amino nitrogen and having from 1 to 18 carbon atoms, monohydric alcohols having from 1 to 18 carbon atoms and monohydric phenols, said alcohols and phenols being employed in a proportion of from about 0.1 to about 4 equivalents per equivalent of anhydride, said ammonia and said amine being used in a proportion of from about 1 to about 2 equivalents per equivalent of anhydride and converting at least a portion of the anhydride groups on the polymer to said ester and amide derivatives.

18. The method of claim 17 in which the ester forming compound is an alcohol having from 1 to 18 carbon atoms.

19. The method of claim 18 in which the alcohol is a primary alcohol.

20. The method of claim 19 in which the alcohol is methanol.

21. The method of claim 19 in which the alcohol is a polyol.

22. The method of claim 19 in which the alcohol contains a tertiary amino group in addition to the hydroxyl group.

23. The method of claim 19 in which the alcohol contains a sulfonic acid group in addition to a hydroxyl group.

24. The method of preparing partial amide derivatives of an interpolymer having a plurality of dicarboxylic anhydride linkages in the main polymer chain and comprising preparing a benzene slurry of a benzene-insoluble interpolymer of substantially equimolar proportions of maleic anhydride and an alkyl vinyl ether having from 3 to 10 carbon atoms and a cross-linking agent selected from the class consisting of (A) from .01 to 10% by weight of the combined weight of monomers defined above of polyallyl sucrose, polyallyl sorbitol, polyallyl pentaerythritol, polyallyl inositol, polyallyl raffinose, polyallyl sulfones, trimethacrylyl triazine, triacrylyl triazine, triallyl cyanurate, methylene-bis-acrylamide, methylene-bis-methacrylamide, N,N'-diallyl acrylamide, polybutadiene having a plurality of side CH$_2$=CH— groups, (B) from 6 to 30% of myrcene and squalene and (C) from 4 to 20% of a liquid polyester of maleic anhydride and a glycol dissolved in styrene and a liquid polyester of maleic anhydride, phthalic anhydride and a glycol and reacting said interpolymer with from about 1 to about 2 moles for each anhydride group of an unsubstituted amine having at least one hydrogen atom on the amino nitrogen and having from 1 to 18 carbon atoms and converting at least a portion of said anhydride groups to amide derivatives.

25. The method of claim 24 in which the amide forming compound is a primary amine.

26. The method of claim 24 in which the amide forming compound is a secondary amine.

27. The method of claim 24 in which the amide forming compound is ammonia.

28. The method of claim 25 in which the primary amine is aniline.

29. The method of claim 26 in which the secondary amine is dimethylamine.

References Cited in the file of this patent

UNITED STATES PATENTS

| | | |
|---|---|---|
| 2,346,858 | Mighton | Apr. 18, 1944 |
| 2,533,635 | Seymour | Dec. 12, 1950 |
| 2,621,169 | Robinette et al. | Dec. 9, 1952 |
| 2,624,715 | Wildish | Jan. 6, 1953 |
| 2,640,039 | Williams | May 26, 1953 |
| 2,746,837 | Kirk | May 22, 1956 |

UNITED STATES PATENT OFFICE
CERTIFICATE OF CORRECTION

Patent No. 2,985,625          May 23, 1961

John F. Jones

It is hereby certified that error appears in the above numbered patent requiring correction and that the said Letters Patent should read as corrected below.

Column 1, lines 17 and 45, for "oil", each occurrence, read -- oily --; line 53, for "$CH_2=<$" read -- $CH_2=C<$ --; column 15, the table beginning at line 40, in the heading to the fourth column therof, after "Partial" insert -- ester --; column 20, line 31, strike out "a", second occurrence.

Signed and sealed this 23rd day of October 1962.

(SEAL)
Attest:

ERNEST W. SWIDER
Attesting Officer

DAVID L. LADD
Commissioner of Patents